Nov. 30, 1965  R. K. HOPKINS  3,220,067
PROCEDURE AND APPARATUS FOR INGOT FORMING
Filed Dec. 2, 1960  11 Sheets-Sheet 1

INVENTOR.
Robert K. Hopkins
BY Green, McCallister & Miller
HIS ATTORNEYS

INVENTOR.
Robert K. Hopkins
HIS ATTORNEYS

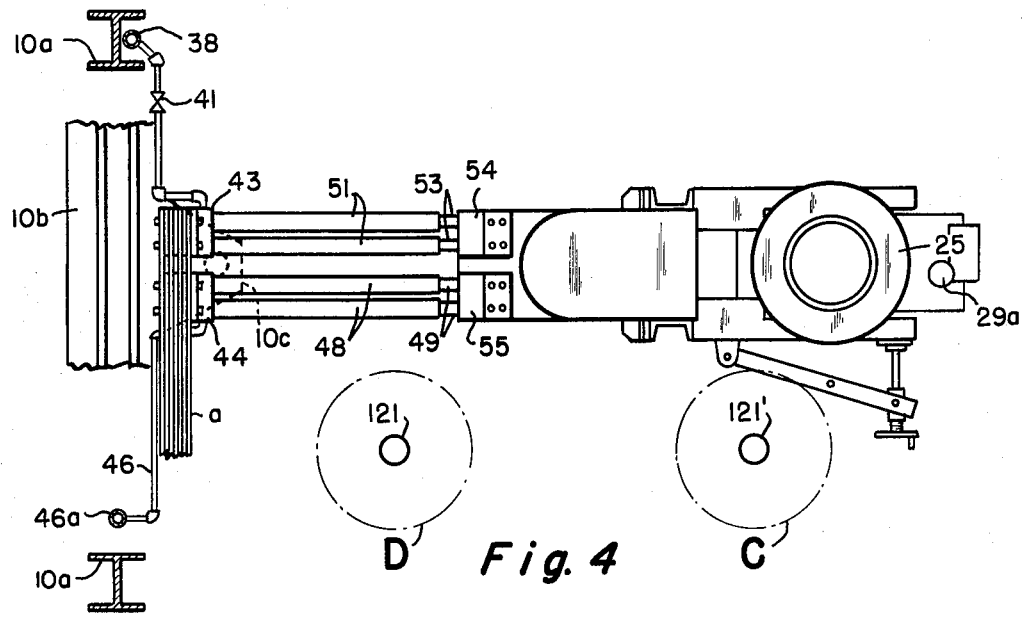
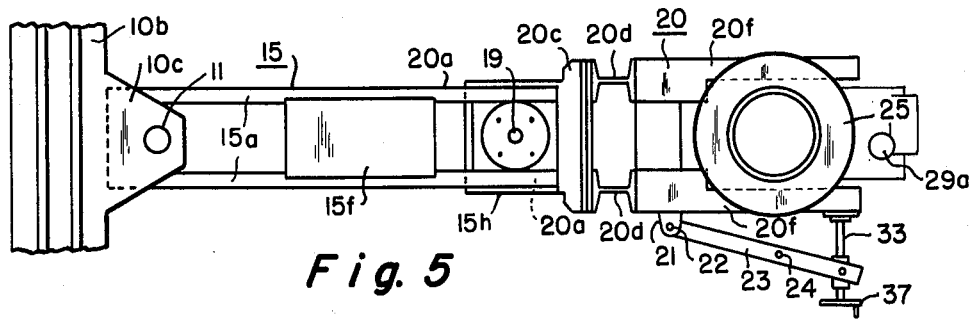
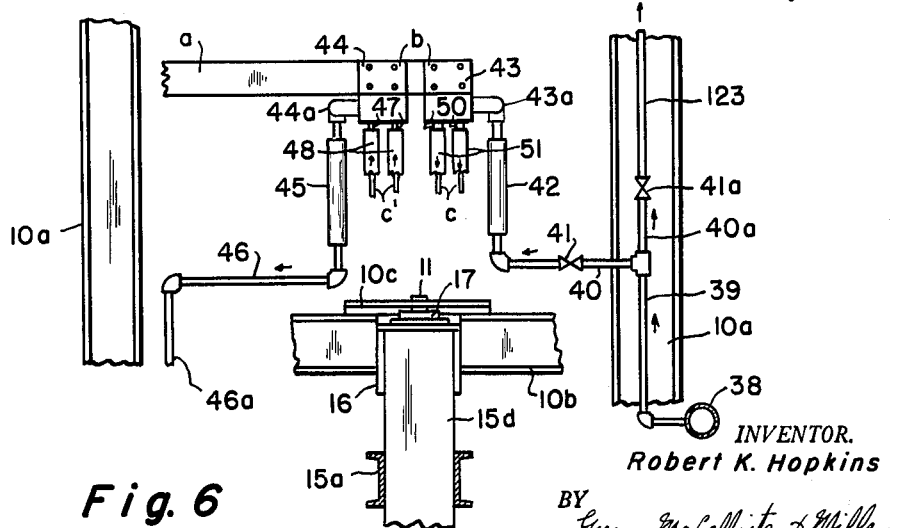

INVENTOR.
Robert K. Hopkins

HIS ATTORNEYS

INVENTOR.
Robert K. Hopkins
BY
Green, McCallister & Miller
HIS ATTORNEYS

Nov. 30, 1965 R. K. HOPKINS 3,220,067
PROCEDURE AND APPARATUS FOR INGOT FORMING
Filed Dec. 2, 1960 11 Sheets-Sheet 6

INVENTOR.
Robert K. Hopkins
BY
Green, McCallister & Miller
HIS ATTORNEYS

INVENTOR.
Robert K. Hopkins
HIS ATTORNEYS

Nov. 30, 1965   R. K. HOPKINS   3,220,067
PROCEDURE AND APPARATUS FOR INGOT FORMING
Filed Dec. 2, 1960   11 Sheets-Sheet 8
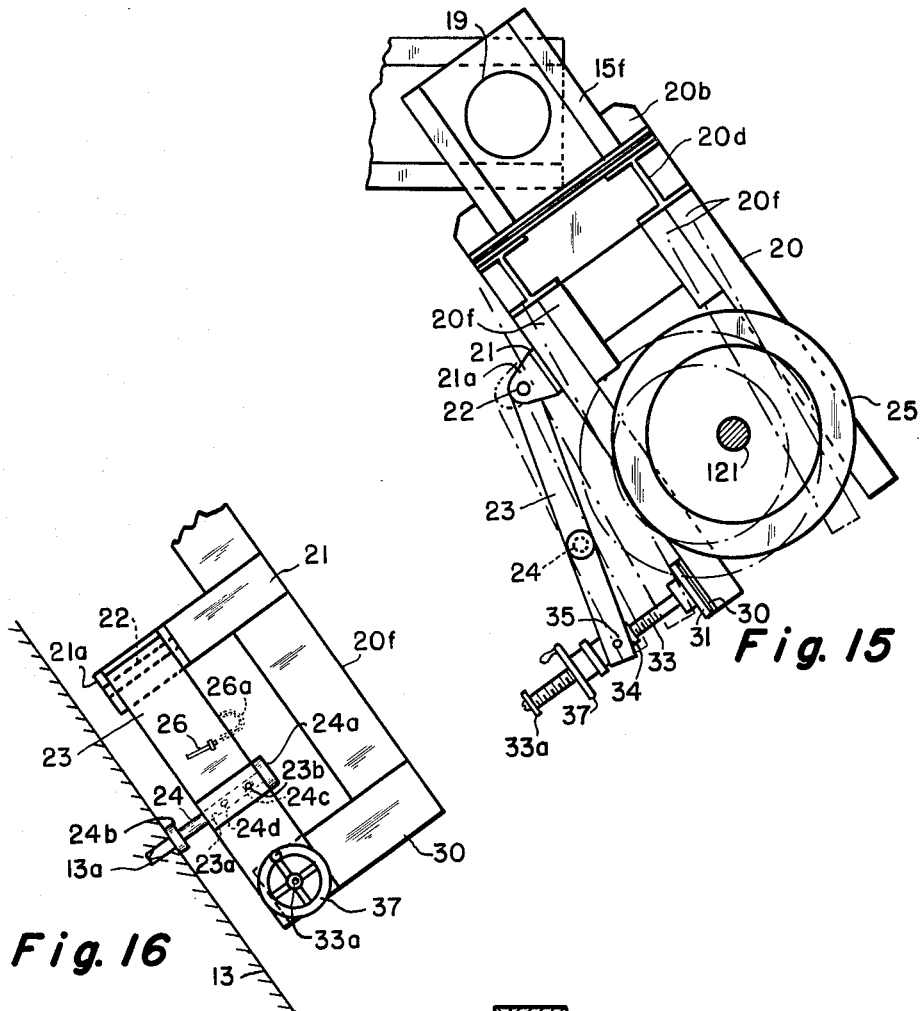
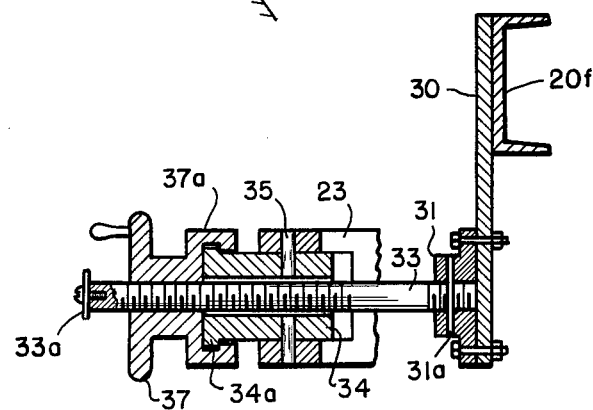
INVENTOR.
Robert K. Hopkins
BY Green, McCallister & Miller
HIS ATTORNEYS Nov. 30, 1965   R. K. HOPKINS   3,220,067
PROCEDURE AND APPARATUS FOR INGOT FORMING
Filed Dec. 2, 1960   11 Sheets-Sheet 9

INVENTOR.
Robert K. Hopkins
BY Green, McCallister & Miller
HIS ATTORNEYS

Nov. 30, 1965  R. K. HOPKINS  3,220,067
PROCEDURE AND APPARATUS FOR INGOT FORMING
Filed Dec. 2, 1960  11 Sheets-Sheet 10

INVENTOR.
Robert K. Hopkins
BY Green, McCallister & Miller
HIS ATTORNEYS

United States Patent Office 3,220,067
Patented Nov. 30, 1965

3,220,067
PROCEDURE AND APPARATUS FOR INGOT FORMING
Robert K. Hopkins, West New Brighton, Staten Island, N.Y., assignor to Firth Sterling, Inc., Pittsburgh, Pa., a corporation of Pennsylvania
Filed Dec. 2, 1960, Ser. No. 73,314
6 Claims. (Cl. 22—57)

This application is a continuation-in-part of my application No. 28,877, field May 13, 1960 entitled Apparatus for Producing Improved Ingot Metal, now Patent No. 3,157,919, issued November 24, 1964, and of my application No. 858,719, filed December 10, 1959, entitled Method and Apparatus for Producing Improved Alloy Metal, now Patent No. 3,152,372, issued October 13, 1964.

This invention relates to electrode forming of ingot metal and particularly, to swing apparatus for moving an ingot mold into and out melting and ingot-stripping positions.

A phase of the invention relates to means for facilitating ingot melting and stripping operations. Another phase relates to apparatus for moving an ingot mold into and out of alignment with an electrode and for adjusting the alignment of the mold with respect to the electrode to provide an improved arc-melting operation. Another phase relates to means for facilitating substantially continuous ingot forming in an electrode melting operation, and a further phase pertains to supplying cooling fluid and electric current to an ingot mold that is positioned on an articulated frame and which mold is to supply current of one potential to metal introduced therein, for example, by fusing off or arc melting a consumable electrode to which electric current of opposite potential is supplied.

Where an ingot such as high quality alloy or ferrous alloy ingot is to be produced, as by consumable electrode melting, difficulty has been heretofore encountered from the standpoint of the exhaustion of a consumable electrode before the completion of the forming of an ingot in a mold. In such a case, it is necessary to use a new or second consumable electrode and in this connection, it is highly advantageous to restart or continue the melting as soon as possible, in order to avoid solidification of the molten surface of the ingot metal, the forming of a parting line, and, in general, to avoid a stratum in the final ingot that lacks uniformity in its structure with respect to the metal above and below it and may result in a defective ingot or the necessity for cutting-away the ingot to a point below such stratum. The desideratum is to so conduct the melting operation so that it will, in effect, be substantially continuous, irrespective of whether or not a single electrode or a single group of electrodes has a sufficient metal content to provide the quantity required for the final ingot.

I have also found it desirable, particularly from the standpoint of efficiency of plant operation and, in view of the rather complex mechanism or apparatus employed for feeding consumable electrodes, to make a substantially coordinated use of electrodes at a station or group of stations. This is done in such a manner that when one ingot has been formed in its mold, it may be swung out of position, the mold stripped, and the ingot removed for further processing. At the same time, a second ingot mold may be swung into position and employed to form an ingot therein, utilizing the same electrode heads or control apparatus. This enables a substantially production-line manufacture of ingots in a minimum amount of plant space, with a minimum of equipment and expense, and in a much more effective and efficient manner.

In accomplishing these results, however, difficulty has been encountered from the standpoint of coordinating the cooperative utilization of ingot molds and their movements, as well as in facilitating their movements, and in effectively supplying cooling fluid or water to the jacketing of the molds and of supplying electric current of one potential to the molds, as required. This must be done in a safe and efficient manner, in spite of the fact that the molds are to be capable of swinging movement and may be utilized as rotating molds during the melting operations.

It has thus been an object of my invention to solve the problem involved in coordinating the operations of a group of ingot molds and a group of electrode stations or control heads to make possible a more efficient production of high quality metal ingots;

Another object of my invention has been to discover the factors involved in the solution to the problem and to devise means for effectively meeting such factors to produce new and improved results in the art;

Another object of my invention has been to devise a procedure, plant system or installation which will make practical a substantial continuous melting of ingot metal by an electric arc procedure where the metal provided at one metal supply station may not be sufficient for forming a complete ingot;

Another object has been to devise a method and means for effectively varying the axial relation between an arc-melting electrode and an ingot mold within which a metal ingot is being formed;

A further object of my invention has been to devise an articulated or swing mounting for ingot molds, which will provide effective and practical cooling fluid and electrical connections to the molds during their operation, and which will enable the molds to be quickly moved or swung from one melting station to another, from a melting station to a stripping station, and from a stripping station back to a melting station without damage to the connections;

A still further object has been to devise an arc melting procedure and apparatus installation which will provide for swinging movement of an ingot mold with respect to the electrode and will additionally provide an accurate adjustment of the melting relationship between the surface of molten metal in the mold and the electrode, for example, a desired off-centered relationship therebetween;

These and other objects of my invention will appear to those skilled in the art from the description of the illustrated embodiment and the claims.

In the drawings, FIGURE 1 is a plan view of a system or apparatus layout of my invention illustrating two mold-swinging units, one of which has moved its ingot mold to one of two melting positions or stations, and the other of which has moved its ingot mold to a stripping station position;

FIGURE 4 is a somewhat fragmental plan view on the scale of and taken along the line IV—IV of FIGURE 3; both FIGURES 3 and 4 show the unit with its swing frame in an intermediate position wherein its swing parts extend substantially perpendicular to its stationary or support structure;

FIGURE 5 is a lower level plan view on the scale of and taken along the line V—V of FIGURE 3;

FIGURE 6 is a vertical end section on the scale of and taken along the line VI—VI of FIGURE 3 and particularly illustrating electrical and cooling fluid connections;

FIGURE 15 is an enlarged fragmental plan view of a secondary arm of a typical unit of the construction of FIGURES 1 and 2, and particularly illustrating means for adjusting or offsetting the relationship between the mold supported or carried thereby and a cooperating electrode;

FIGURE 16 is a side view in elevation on the scale and of the apparatus of FIGURE 15;

FIGURE 16A is a greatly enlarged fragmental horizontal section showing details of the construction of the adjusting means of FIGURE 15;

Figure 20:
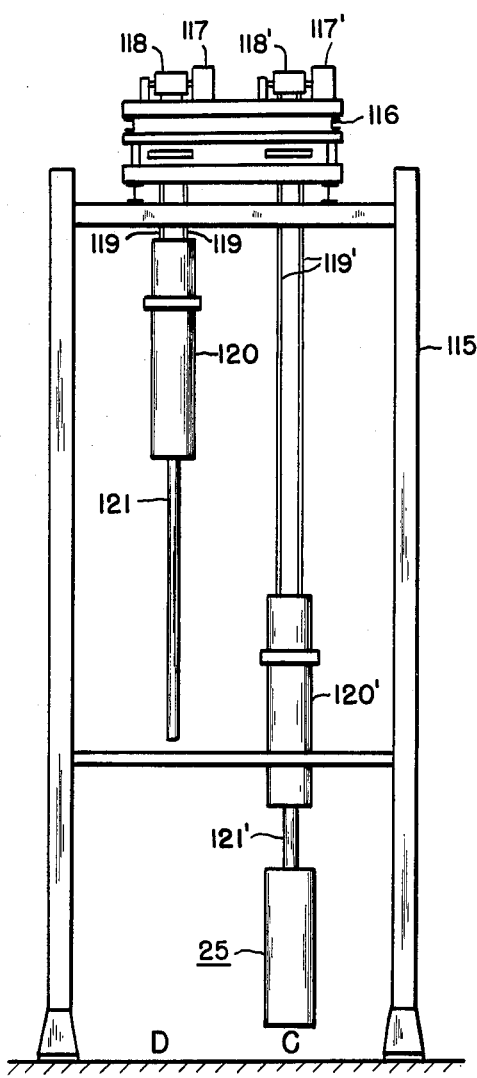
Figure 21:
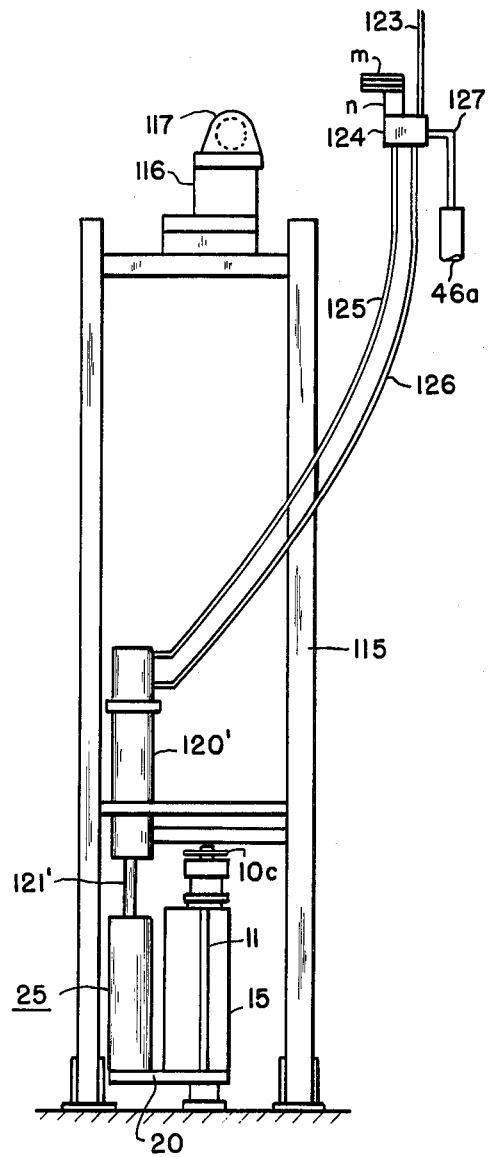

FIGURE 20 is a side view in elevation somewhat diagrammatically illustrating electrode holding and control apparatus for raising and lowering electrodes into and out of a melting position with respect to a mold at electrode stations; in this figure, one electrode is in an upper "ready" position, while the other is in a "down" or melting position; and FIGURE 21 is a side view in elevation on the scale and of the construction of FIGURE 20.

Figure 1:
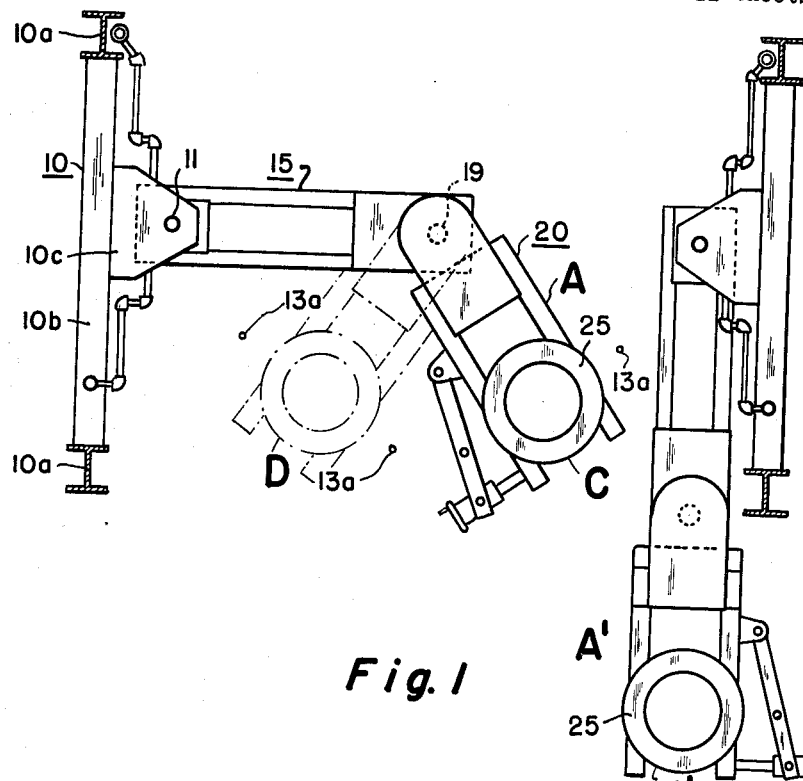
Figure 2:
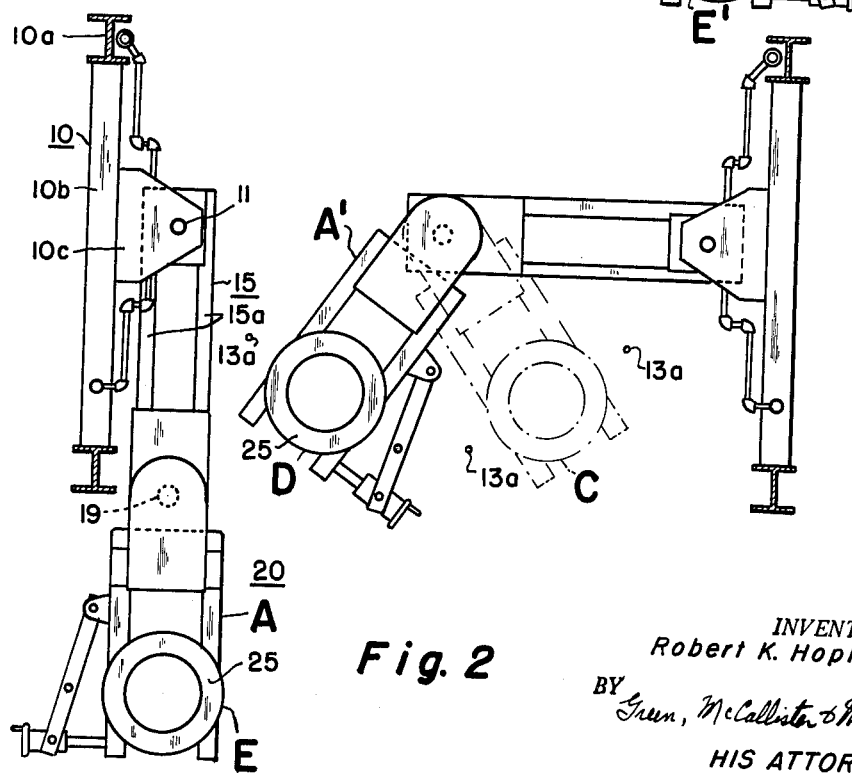
FIGURE 2 is a view on the scale of and similar to FIGURE 1, but illustrating the first unit in a mold stripping position and the second unit in one of two alternate ingot melting positions.

Referring particularly to FIGURES 1 and 2 of the drawings, I carry out my invention by employing a stationary support structure 10 with respect to which fluid and electrical flow connections may be terminalized, a primary swing frame arm 15 which is pivotally or swingably mounted by a primary swing or pivot shaft 11 on the stationary structure, and a secondary swing frame or arm 20 which is pivotally or swingably mounted by a secondary swing or pivot shaft 19 on the primary arm 15. The secondary arm 20 is adapted to carry an ingot mold unit 25 so that it can, as shown to the left of FIGURE 1, be alternately moved between electrode stations C and D to effect an ingot forming or melting and casting operation. After an ingot has been melted and cast in a mold unit 25, then the arms 15 and 20 may be swung, as shown in FIGURE 2, to a position substantially along or parallel to the stationary structure 10 and at which the mold 25 is at an ingot stripping position E.

In the layout of FIGURE 1, I have illustrated a pair of units, generally designated as A and A', which may be operated in a coordinated manner, as illustrated. In other words, when the unit A is in an ingot-forming position of FIGURE 1, then the other unit A' may be in an ingot-stripping position E'. Conversely, as shown in FIGURE 2, when the unit A is at an ingot-stripping position E, the other unit A' may be in one of the ingot-melting positions D or C. In this manner, I utilize a minimum of plant space and, in effect, have been able to substantially continuously employ the ingot forming stations C and D and, in such a manner, that there is no interference between the forming of one ingot and the stripping of another. Once a mold shell wall has been stripped off and the ingot removed, it may then be replaced and, at this time, the particular unit is then ready for a second melting or casting operation, while the other unit in which an ingot has been cast may be then swung to its stripping position.

These figures further illustrate that when one consumable electrode at, for example, station C in FIGURE 1 has been fully consumed, then the arm 20 may be swung into position with respect to a second electrode station D, its electrode lowered, see also FIGURES 20 and 21, and the melting operation continued. The arm 20 is further provided with means for accurately adjusting the alignment of an ingot 25 with respect to an electrode so as to provide a centered or any desired off-centered relationship during the melting operation or to adjust such a relationship as a melting operation progressess, see also FIGURES 15, 16 and 16A.

Figure 3:
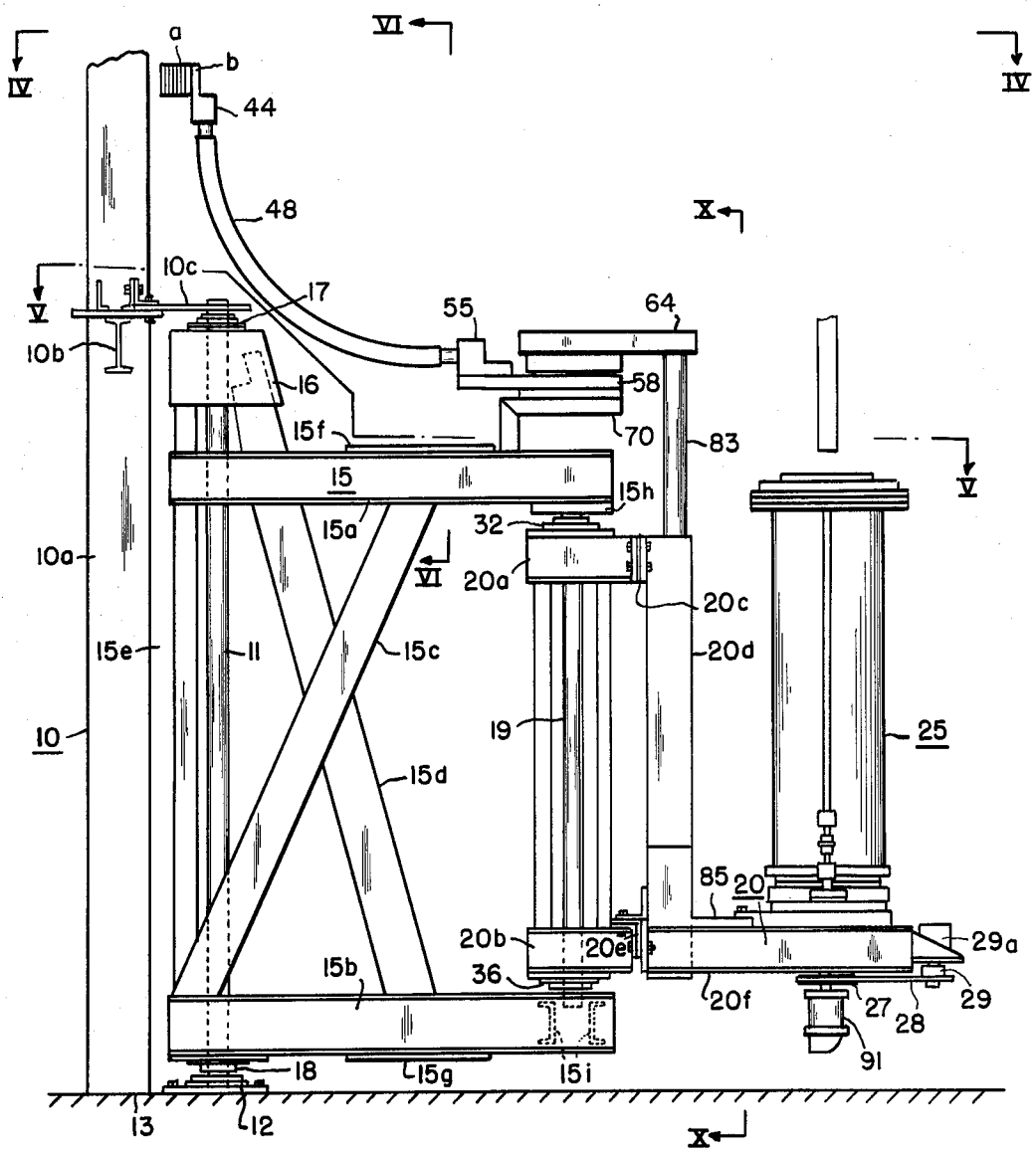
FIGURE 3 is a slightly enlarged side view in elevation of a representative one of the units of FIGURES 1 and 2.

As shown particularly in FIGURES 1, 2 and 3, the stationary frame 10 which may constitute a permanent part of the plant has a pair of vertical upright beam members 10a connected by a horizontal cross member construction 10b. A forwardly-projecting tongue or top mounting plate member 10c is secured to the frame portion 10b to carry the upper end of the primary vertical pivot or swing shaft 11. As shown particularly in FIGURE 3, the shaft 11 rotatably positions vertically spaced-apart upper and lower portions of the primary swing frame 15 by means of bearing assemblies 17 and 18. These bearing assemblies are of conventional construction and are of the same type as employed for the secondary pivot or swing shaft 19 of the secondary frame structure or arm 20, see the bearings 32 and 36 of FIGURE 9 of the drawings. The lower end of the primary pivot shaft 11 is mounted in a floor stand 12 that may be secured, as shown in FIGURE 3, to the plant base or floor 13, for example, of concrete.

The primary swing frame or arm 15 has, as shown particularly in FIGURES 3 and 5, a pair of spaced-apart and cross-connected top beam members 15a and a pair of spaced-apart and cross-connected lower beam members 15b. Top and bottom plates 15f and 15g secure the members 15a and 15b of the respective pairs together. In addition, the upper and lower members 15a and 15b are connected to each other in a vertically-spaced relation by spaced-apart pairs of diagonal members 15c and 15d, as well as by a back end wing member assembly 15e. The pair of diagonal members 15d with the wing assembly 15e project into and are secured to an upper swing platform 16 which carries the upper bearing assembly 17. It will be noted that the lower bearing assembly 18 is carried by the lower members 15d and the wing assembly 15e.

The forward end portion of the primary swing frame or arm 15 carries a bottom plate member 15h that is secured to under side of the beam members 15a and which serves as an upper end mounting for secondary swing shaft 19. The lower end of the shaft 19 is carried, as shown particularly in FIGURES 3 and 9, by a cross beam and plate assembly 15i that is secured to extend between the lower members 15b of the swing frame.

The secondary swing frame structure or arm 20 (see FIGURES 3 and 5) has a pair of cross-connected, upper, channel-shaped members 20a and a lower pair 20b. The upper pair is secured by a cross head assembly or connection 20c to a pair of horizontally spaced-apart vertical beam members 20d (see also FIGURE 9) which are, in turn, at their lower ends secured to and support a pair of forwardly-projecting fork members 20f. It will be noted that the lower end portions of the vertical members 20d are secured to the inner ends of the members 20f and to the outer ends of the members 20b by an angle bracket assembly or connection 20e.

Figure 9:
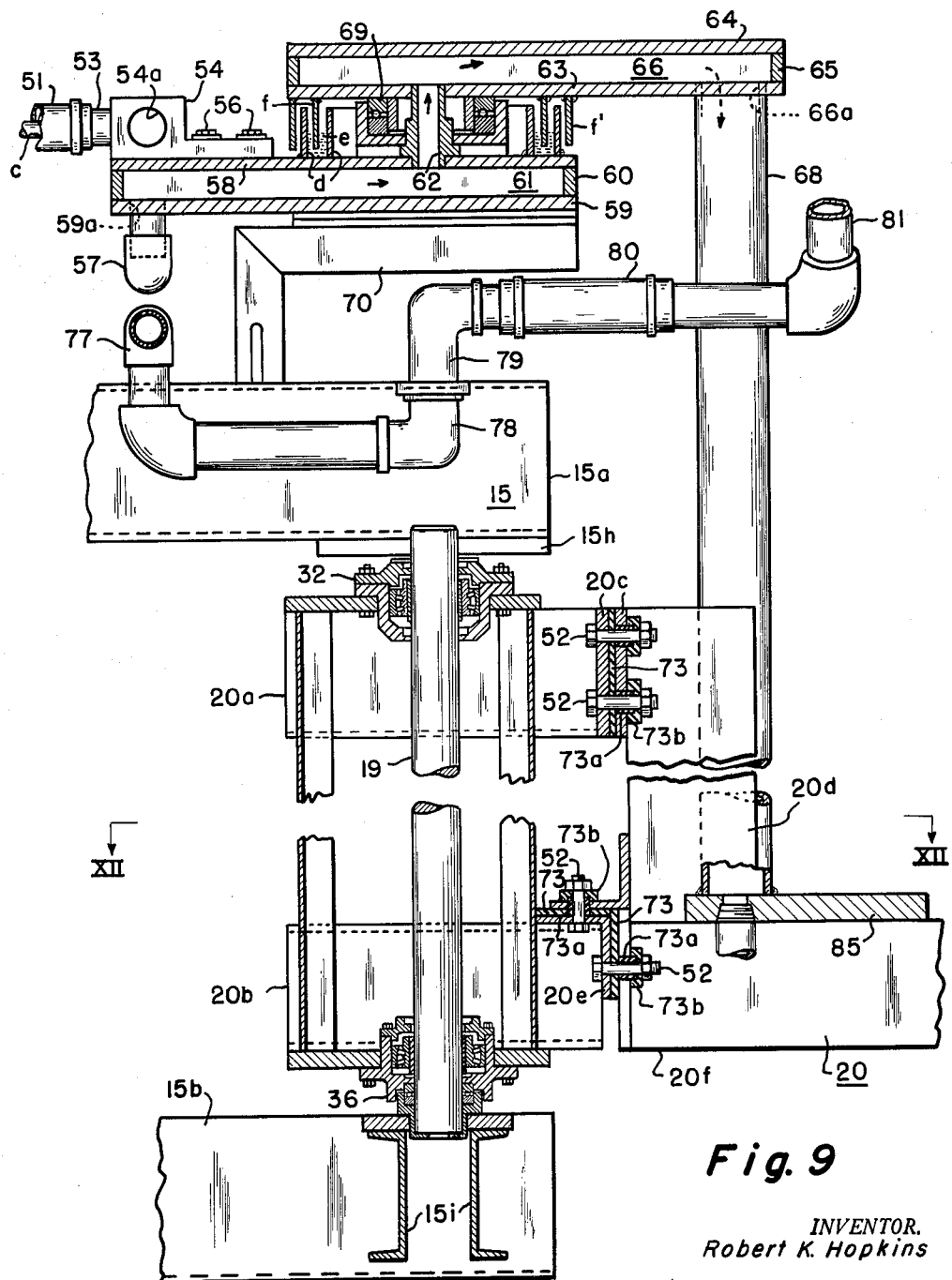
FIGURE 9 is a side view in elevation on the scale of and taken along the line IX—IX of FIGURE 7.

As shown particularly in FIGURE 9, the connection 20c between the members 20a and 20d as well as the connection 20e between the members 20b and 20f is effected by nut and bolt assemblies 52. The joints between the connections 20c and 20e are insulated by insulating spacers 73, sleeves 73a and washers 73b. In this manner, the forwardly-projecting frame members 20f as well as the vertical members 20d are electrically isolated from the main or swing-mounted portions of the frame or arm 20.

As shown, the fork members 20f are adapted to carry and support an ingot mold unit 25. This unit, see particularly FIGURES 3 and 17, may, as shown, have a bottom journaling and fluid connection head 91 within which a table rotating shaft 108 (see FIGURE 19) is adapted to extend. This shaft carries a drive sprocket 27 that may be driven through chain 28 by a sprocket 29 that is carried by the shaft of an electric motor 29a. The motor 29a may, as shown particularly in FIGURE 3, be mounted on to extend from one of the fork members 20f.

With particular reference to FIGURES 5, 15, 16 and 16A, means has been provided for anchoring the secondary arm or swing frame 20 with respect to the plant floor 13 at the electrode stations C and D. As shown particularly in FIGURES 1 and 2, the plant floor may have a series of alternate detent-receiving slots or holes 13a, in order that the mold unit 25 carried by the secondary swing arm 20 may be anchored in a suitable position with respect to an electrode at one of the stations C or D. This anchoring is accomplished by a horizontally-extending side adjustment arm member 23 that at one end is pivotally mounted by a pin shaft 22 (see FIGURE 16) within a swing-support bracket 21a of a downwardly-projecting extension member 21. It will be noted that the extension member 21 is secured to project from one side of one of the fork members 20f. A detent or anchor pin 24 is carried within a vertical bore or hole 23a in the adjustment member 23 to project downwardly therefrom.

The detent pin 24 has a top, stop head 24a that is adapted to abut the member 23 when in its "down" position of FIGURE 16, and has a bottom stop flange 24b that is adapted to abut the floor 13 when in such a "down" position. The pin 24 has a pair of cross slots 24c and 24d in a vertically-spaced relation therealong, in order that a headed cross pin 26 may be inserted into cross slot 23b of the member 23 and alternately inserted through 24c or 24d to hold the pin 24, either in its upper out-of-floor engaging position or its floor-engaging position of FIGURE 16. As shown in FIGURE 16, the cross pin 26 is secured by a chain 26a to the arm 23 so that it is always available.

Although the detent pin 24 is for general alignment of a mold unit 25, I have provided means for fine adjustment of the relationship between the mold unit or its molten metal surface and the electrode. This means may be employed initially and, if desired, during the melting operation, as it progresses. This means, as shown particularly in FIGURES 15, 16 and 16A, is carried by a second downwardly-projecting extension member 30 which is secured to a front end of one fork member 20f. The lower end of the member 30 has a mounting collar 31 within which the inner end of a threaded adjustment stem or screw 33 is threaded and is non-rotatably secured by a cross-pin 31a to project forwardly therefrom. A slide collar 34 having a diameter corresponding to the outer diameter of the pitch of the threads of the stem 33 is positioned thereon for slide movement and has connecting pin portions 35 that secure it to the bifurcated forward end of the adjustment arm 23.

A hand wheel 37 having internal or female threads corresponding to the male threads of the stem 33 is adjustably mounted thereon and is limited in its maximum outer movement by a screw-mounted head or stop disc 33a (see FIGURE 16A). The hand wheel member 37 has a mounting-over flange portion 37a which fits over an annular flange 34a of the slide collar 34, so as to rotatably carry the collar 34 and move it along the stem 33, as adjustment is made by turning the hand wheel 37. This, in turn, causes the arm 23 to adjust the frame 20 inwardly and outwardly about the pivot pin 22 and the detent pin 24. In FIGURE 15, I have indicated in full lines one (centered) position of the mold unit 25 and by dot and dash lines representative adjusted (offset or off-centered) positions of the same unit with respect to an electrode 121 (or 121′, see FIGURE 4).

As shown in FIGURES 4 and 6, a pair of electric terminal and primary water distribution inlet and outlet headers 43 and 44 are mounted on stationary overhead plant bus bars a. Water or cooling fluid carried by a plant overhead main supply header 38, as shown particularly in FIGURES 4 and 6, is introduced to an inlet header 43 by branch lines 39 and 40, through a shut-off and control valve 41, a hose section 42 and an inlet connector 43a. It will be noted that the hose section 42 is of a suitable material, such as rubber, to electrically insulate the branch line 40 from the inlet connector 43a and the header 43. Circulated warmed fluid or water leaves outlet header 44 through outlet connector 44a and is connected to a delivery line 46 by a hose section 45. The hose section 45, like the section 42, constitutes an electric insulator. Warmed fluid is discharged from the delivery line 46 into a pipe connector 46a for a sewer pipe or a cooling unit of a re-circulating system, as desired.

As shown particularly in FIGURE 6, overhead plant bus bars a supply electric current of one potential through terminals b to the primary headers 43 and 44. As shown in FIGURES 3 and 6, the headers 43 and 44 are mounted on the bus bars a. The headers 43 and 44 may be of a suitable electrically-conductive material, such as of copper or a copper alloy.

Figures 13, 14:
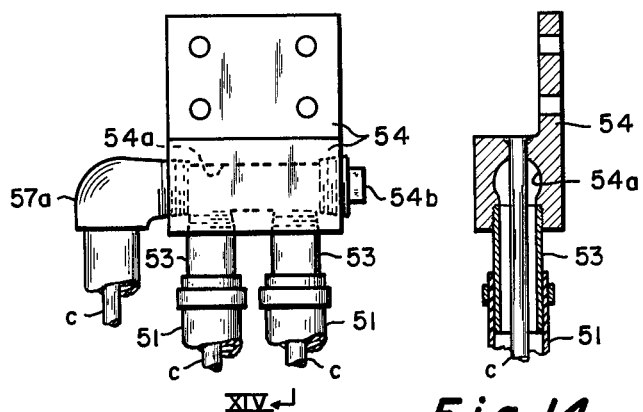
FIGURE 13 is an elarged fragmental plan view showing typical water-cooled electrical connections employed in accordance with my invention.
FIGURE 14 is a section on the scale of and taken along the line XIV—XIV of FIGURE 13.

FIGURES 13 and 14 indicate the method I employ throughout my construction for making electrical connections between electrically-conductive fluid-carrying members or headers and conductor cables (such as of braided conductor wire), and for positioning the electrical conductor cables to extend along the inside or fluid passageways of fluid-carrying lines or piping, although shown specifically applied to secondary header 54. That is, an electric cable, such as braided cable c is brazed at its one end to a member or header body, such as 54, and is adapted to extend centrally along fluid piping, such as 53, so that it is both protected and cooled by the flow of fluid therealong; the cable is connected in a similar manner at its other end to, for example, a second member or header body, such as the primary inlet 43 of FIGURE 4. Cables c′ are also connected between primary outlet header 44 and secondary outlet header 55. As will be hereinafter indicated, the cables c and c′ are of the same electric potential and are employed as parallel lines for supplying electricity of one potential to the mold unit 25.

The in-flow primary supply header 43 has end outlet connections 50 (see FIGURE 6) which are connected through flexible hose sections 51 and end inlet connectors 53 (see FIGURE 4) to the secondary inlet supply header 54 that is mounted forwardly of the header 43 on the swing arm 15. In a like manner, primary out-flow header 44 has end inlets or connectors 47 that are connected by flexible hose sections 48 and outlet connectors 49 to secondary outlet header 55 which is mounted adjacent the secondary inlet header 54. The hose sections 51 and 48 may be of a suitable insulating material, such as rubber, so as to electrically isolate the connectors 50 and 53 and the connections 47 and 49 and to provide flexible connections from the headers 43 and 44 which are mounted on the bus bars $a$ to the headers 54 and 55 which are mounted on the swing frame 15.

Figure 7:
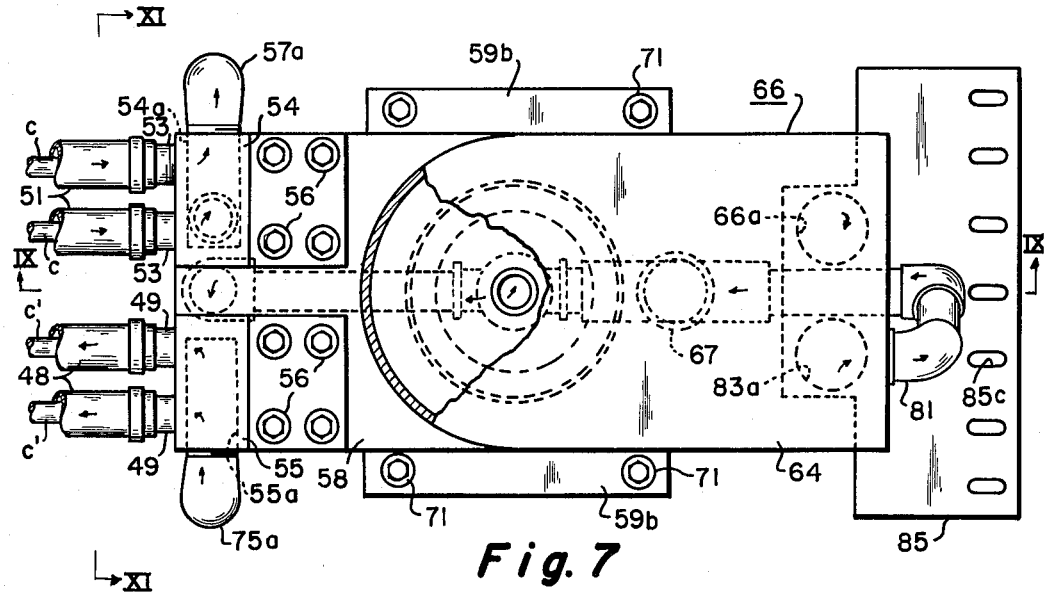
FIGURE 7 is a plan view on a further enlarged scale of an upwardly-positioned swing and connection part of a primary swing arm of the unit of FIGURE 3.
Figure 8:
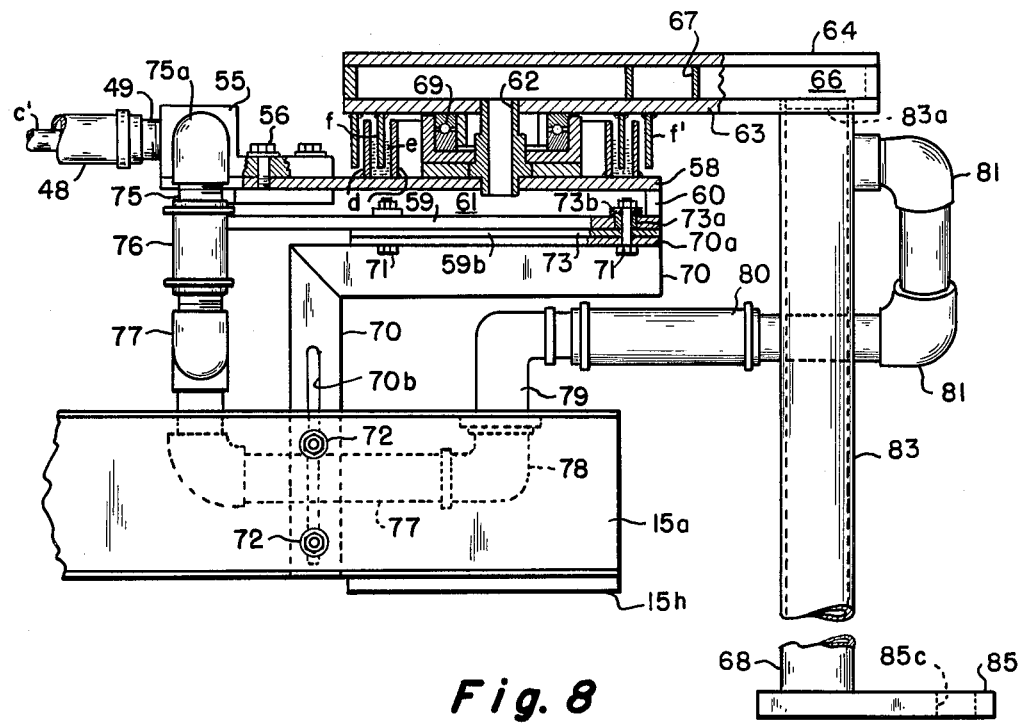
FIGURE 8 is a side view in elevation and partial section on the scale and of the part of FIGURE 7, further illustrating connections thereto and support means therefor.

As shown particularly in FIGURES 7, 8 and 9, incoming cooling fluid enters a transverse bore 54a of the secondary inlet header 54 and flows transversely-outwardly therefrom through an outlet connector 57a. The header 54 is removably mounted on a fluid-jacketed lower table construction consisting of a lower plate wall 59, a top plate wall 58, and side walls 60, by bolts 56 which extend into the top wall 58. It will be noted that the walls 58, 59 and 60 define an internal cooling-fluid chamber 61 therein, see FIGURES 8 and 9.

Figure 11:
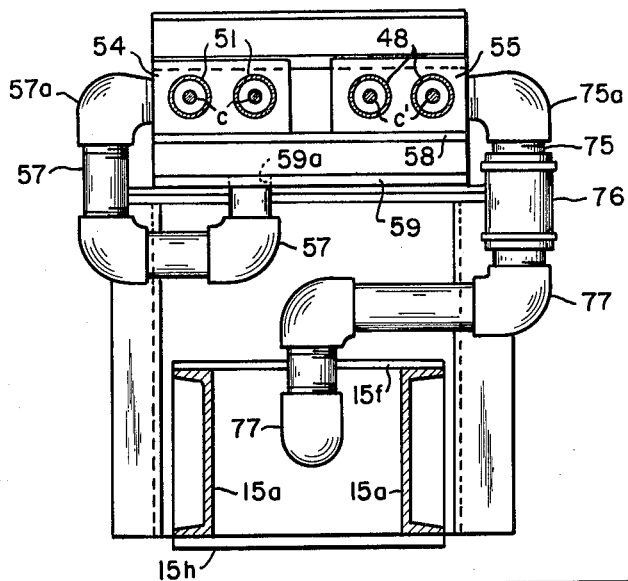
FIGURE 11 is an end view in elevation on the scale of and taken along the line XI—XI of FIGURE 7.

As shown particularly in FIGURES 9 and 11, the out-flow from the outlet connector 57a is to a pipe system 57 which at its other end is connected to an inlet opening 59a in the wall 59, so as to directly supply the chamber 61. Cooling fluid entering the chamber 61 flows upwardly, as shown in FIGURE 9, along the hollow center of a pivot sleeve 62, and into an upper chamber 66. The upper chamber 66 is defined by an upper table having a bottom plate wall 63, a top plate wall 64 and a side wall 65. The upper cooling-fluid jacketed table is carried in a swingable relationship on the lower cooling-fluid jacketed table by the pivot sleeve 62. The lower end of the pivot sleeve 62 is, as shown in FIGURE 9, journaled for turning movement or rotation within the top wall 58 by bearing assemblies 69 that are operatively positioned between the top wall 58 of the lower fluid-jacketed table and the bottom wall 63 of the upper fluid-jacketed table. The member 67 (see FIGURES 7 and 8) is a centrally-positioned spacer between wall plates 63 and 64 of the upper swing table.

Cooling fluid leaves the chamber 66 (see FIGURE 9) through an outlet port 66a and discharges into a down-flow pipe 68, preferably of good electrical conductive properties, such as of copper. The headers 54 and 55 and the walls 58, 59, 60, 63, 64 and 65 are also preferably of such a material. Electric current (see FIGURE 9) supplied to the secondary headers 54 and 55 is thus conducted to the top wall 58 of the lower table and through a pair of upwardly-projecting horizontally spaced-apart, annular, conductive fins or flanges $d$, through a conductive fluid, such as liquid mercury $e$ to annular conductor fin or flange $f$. An annular outer fin $f'$ cooperates with an outer one of the fins $d$ to define a dirt trap for the conductor trough. It will be noted that the fins $d$ are secured to project upwardly from the wall 58 and define an annular conductor trough or chamber for receiving the conductor liquid $e$, and that the fins $f$ and $f'$ are secured to project downwardly from the wall 63; the fin $f$ projects substantially intermediate of such annular though or chamber, and within the conductor liquid $e$. Thus, at all times, an efficient electrical connection is made between the upper and lower fluid-jacketed tables, irrespective of the swingable mounting of the upper table with respect to the lower table, and through the members of the upper table to the down-flow pipe 68 and a parallel up-flow pipe 83 which also serve as electrical current supply connectors (see FIGURES 10 and 12).

Figure 10:
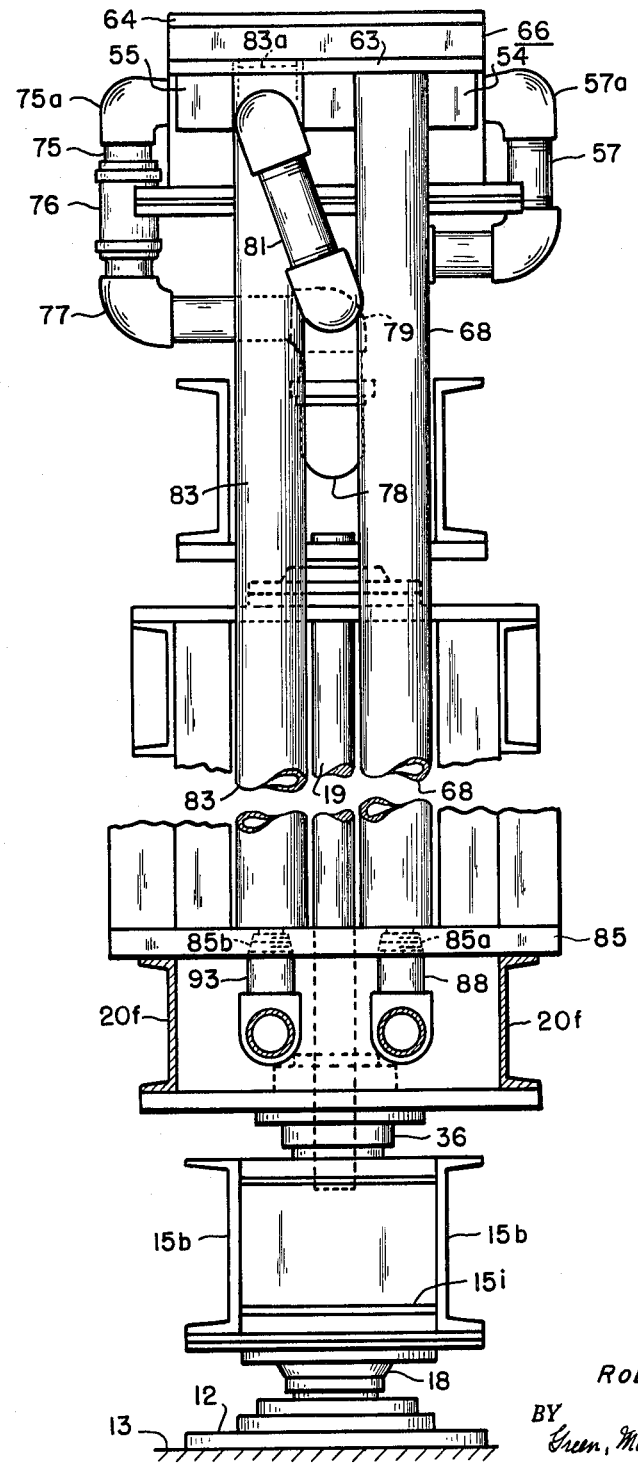
FIGURE 10 is an end section in elevation on the scale of FIGURE 7 and taken along the line X—X of FIGURE 3.

The header 55, like the header 54 (see FIGURES 7 and 8), is secured by bolts 56 to the top wall 58 of the lower jacketed table and has a transverse bore 55a that is open at one end to an inlet connector 75a to supply warmed fluid to the outlet connectors 49. Piping 75, as shown particularly in FIGURES 8 and 10, is connected to the inlet 75a and through an electrical segregating or insulating hose 76 and piping 77 to a swing elbow 78 and piping 79. It will be noted that the swing elbow 78 forms a swing joint between piping 77 and 79 to permit swinging movement between the left-hand and the right-hand portions of the piping connections of FIGURE 8. The right-hand portion is connected through an electrical insulating hose 80 and piping 81 to the vertical up-flow pipe 83 which is positioned parallel to the down-flow pipe 68 and may be of the same electrically conductive material, such as copper. The upper end of the pipe 83 is secured to the bottom of the wall plate member 63 of the upper swing table and is plugged at 83a with respect thereto.

As shown particularly in FIGURES 7, 8 and 9, the lower table is secured above the upper members 15a of the primary swing arm or frame 15. For this purpose, a pair of horizontally spaced-apart, side-mouthed, angle-shaped brackets 70 are provided. An upper, side-projecting, horizontal flange 70a of each bracket 70 is adapted to receive a side extension flange 59b of the lower wall 59 of the lower table and to be secured thereto by bolt and nut assemblies 71. Insulating spacers 73, sleeves 73a and washers 73b are employed for these joints to electrically insulate the brackets 70 from the electric current-carrying tables. The lower portion of each bracket 70 has a vertical slot 70b therealong, in order that each bracket may be adjustably-secured by bolt and nut assemblies 72 to an associated one of the pair of upper frame members 15a of the swing arm 15, see FIGURE 8.

Figure 17:
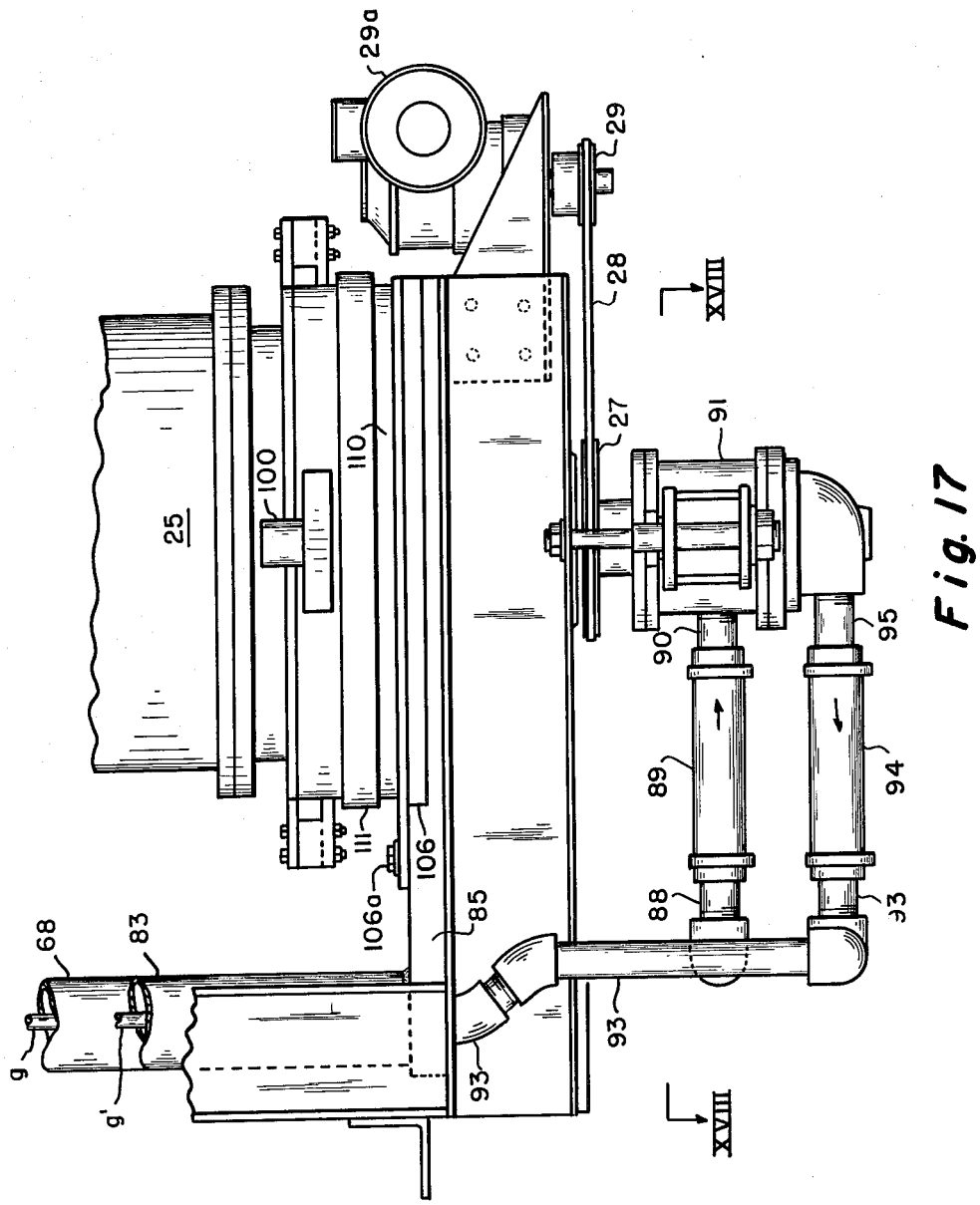
FIGURE 17 is a fragmental side view in elevation showing connections to a rotating mold support table unit which may be of somewhat similar construction to the table unit disclosed and described in my co-pending Application 858,719, filed December 10, 1959.

As shown in FIGURES 10, 12, 17 and 19, the lower ends of the vertical pipe members 68 and 83 are brazed to a side extension member 85 of the mold unit 25. The member 85 constitutes an extension of the stationary table 106 of the unit 25, as shown in FIGURE 17, and is of a suitable electrically-conductive material, such as copper. As shown in FIGURES 7 and 8, the member 85 may be provided with slots 85c to receive bolts for securing it to the table 106. Ports 85a and 85b extend from the lower ends of each of the pipe members 68 and 83, see particularly FIGURE 10. Pipe connector 88 (see FIGURES 10 and 17) cooperates with the port 85a to supply cooling fluid from the pipe member 68 through an electrically-insulating hose 89 to an inlet connector 90 of the bearing housing and header 91 of the mold unit 25. In a like manner, pipe connector 93 supplies warmed fluid to the vertical pipe 83 through the port 85b by means of insulated hose 94 and an outlet connector 95 which extends from the header 91.

Figure 12:
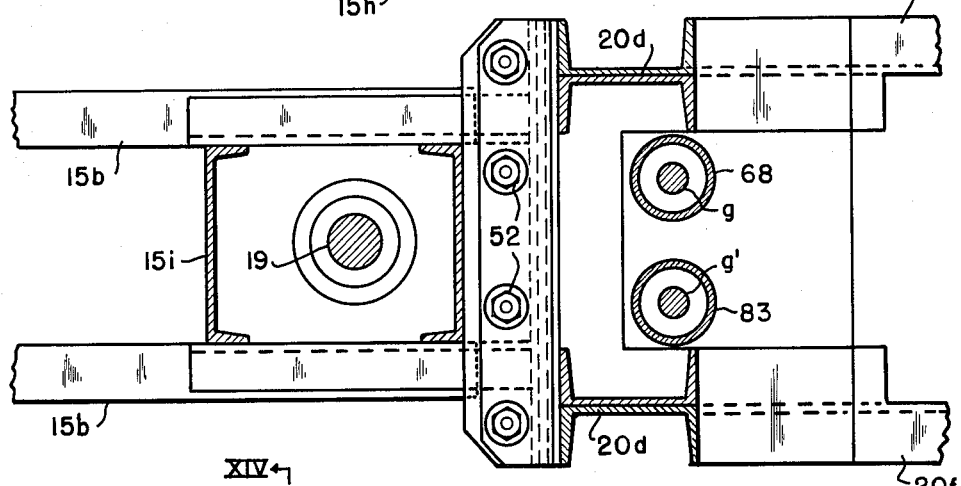
FIGURE 12 is a horizontal section on the scale of and taken along the line XII—XII of FIGURE 9.

As shown in FIGURE 12, braided conductor cables $g$ and $g'$ which, at their upper ends are electrically connected to the upper swing table of FIGURE 9, respectively extend along the down-pipe 68 and the up-pipe 83 and are electrically connected (see the representative method of FIGURES 13 and 14) at their lower ends to the electrically-conductive extension member 85.

Figure 18:
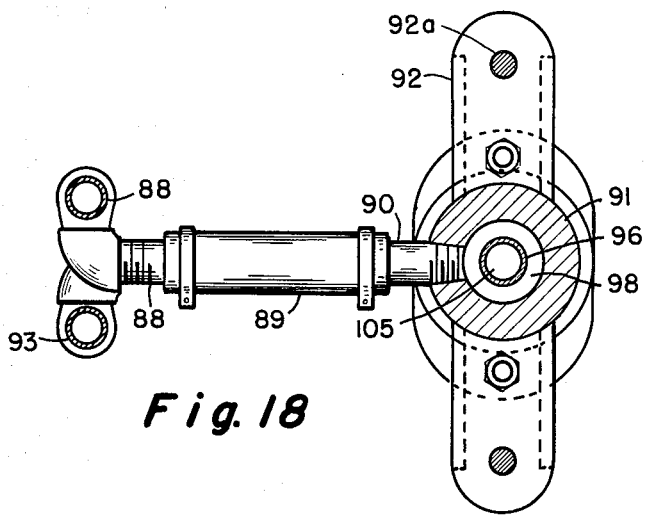
FIGURE 18 is a horizontal section on the scale of and taken along the line XVIII—XVIII of FIGURE 17.
Figure 18A:
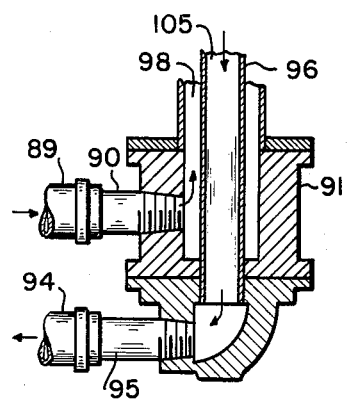
FIGURE 18A is a vertical section on the scale of FIGURE 18 and taken along the line XVIIIA—XVIIIA of FIGURE 19.
Figure 19:
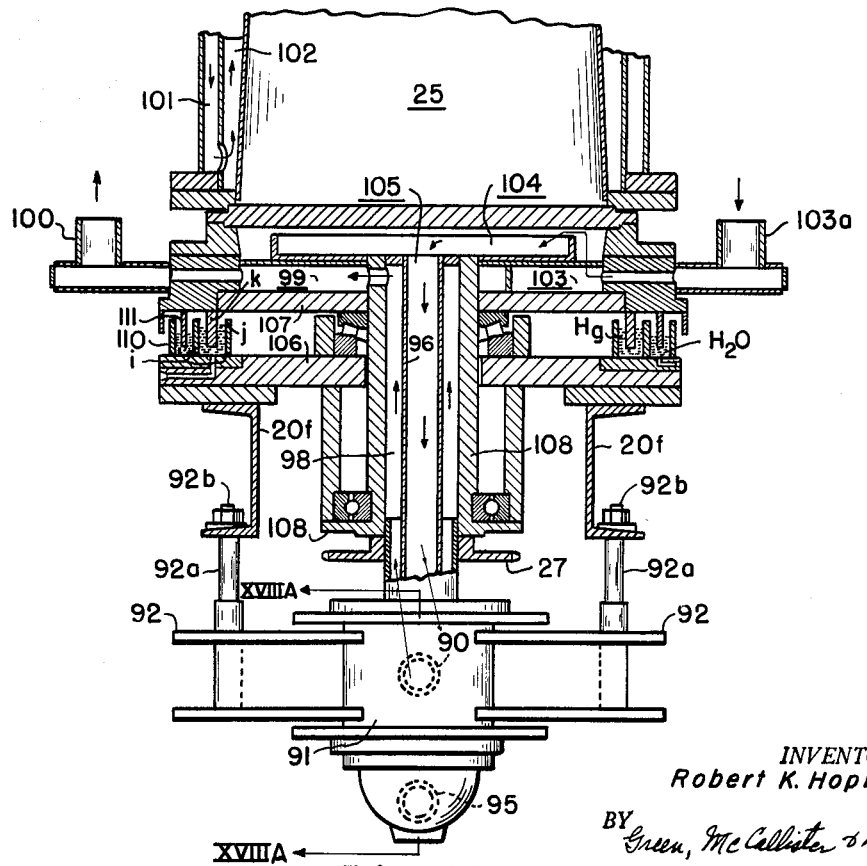
FIGURE 19 is a vertical section taken at right angles to and on the scale of the construction of FIGURE 17.

In FIGURES 17 to 19, I have shown a rotating table construction for the mold unit 25 which, in general principle and construction, is similar to that disclosed in my co-pending Application 858,719, filed December 10, 1959; it is merely illustrative of a suitable rotative table construction. It will be noted that a stationary table may be used in accordance with my present invention and that the table illustrated is only to show how electrical and fluid connections are made thereto. Briefly, as indicated, cooling fluid introduced from the down-pipe 68 of FIGURE 17 is shown flowing upwardly from the inlet 90 (see FIGURES 18A and 19) of the head 91, along an outer vertical chamber 98, through a port into a side chamber (inlet) 99, and out through end nipple 100 and a hose (not shown), through the top header of the mold wall or shell, downwardly along its outer chamber 101, upwardly along its inner chamber 102, through a top header outlet and a hose to an inlet nipple 103a of a second side chamber (outlet) 103. It will be noted that side chamber 103 is separated from chamber 99 and constitutes a warmed fluid return chamber. Warm fluid from the chamber 103 flows through a port into an upper mold table chamber 104 for cooling the bottom of the mold, then centrally-vertically down along a vertical chamber 105 that is defined by an inner rotating table-supporting sleeve shaft 96, and out from outlet connector 95 to the warmed fluid up-pipe 83.

The connections of the cables g and g' to the extension member 85 (see FIGURE 17) provide electrical current of one potential through stationary table 106 to the mold unit 25 from the bus bars a of FIGURE 3. The sprocket 27 (see FIGURE 19) may be of a laminated resin construction or may be secured to the outer sleeve shaft 108 by an insulating connector sleeve in order to electrically-insulate the rotating table from the drive motor 29a of FIGURE 3. As shown in FIGURE 19, the header 91 has a mounting extension frame 92 that suspends it from the frame members 20f of FIGURES 5, 9 and 12 through the agency of spacer rods 92a and nuts and washers 92b. Electric current is conducted from the stationary table 106 of good conductor material (see FIGURE 19), through spaced-apart, annular, trough-defining flanges or fins i that project upwardly therefrom, to a liquid (mercury) bath conductor j, to an annular conductor flange or fin k, to a rotating table 107, and from the rotating table 107 directly to the bottom of the mold of the unit 25. Fin or annular flange 111 of the rotating table 107 cooperates with an outer one of the flanges i and a second flange 110 of the stationary table 106 to seal-off the conductor trough and its conductor liquid j. In this connection, an outer water-receiving trough is defined on the table 106 which provides a seal with the water contained therein and with the flange 111 of the rotating table 107; if desired, cooling fluid or water may be circulated along this trough to keep the mercury j at a suitable operating temperature. The table 107 (see FIGURE 19) may be rotated by the motor-driven sprocket 27 that is secured to outer sleeve-like shaft member 108.

Referring to FIGURES 20 and 21, I have somewhat diagrammatically illustrated electrode structure for supplying electrodes, such as consumable electrodes 121 and 121', at stations C and D. The structure includes a vertical frame 115, an overhead operating mechanism 116 which includes electric brakes, reversible motors 117, 117', and winding drums 118 and 118', one for each electrode. A vertically-movable holder 120 (or 120') is carried along a vertical track (not shown) by cables 119 (or 119') which wind on the drum 118 (or 118'). A consumable electrode 121 is shown in FIGURE 20 at station D as carried by the holder 120 in an "up" or "ready" position; in this figure, the holder 120' is shown in a lower position in which its consumable electrode 121' is being melted within a mold unit 25 at station C.

For best results, I prefer to water-jacket the electrode holders 120 and 120' and in this connection, I show a branch supply pipe line 40a (see FIGURE 6) connected through a shut-off and control valve 41a and piping 123 to a combined electric terminal and fluid header unit 124 (see FIGURE 21). Cooling fluid entering from the piping 123 flows from the header 124 along flexible piping 125 to the fluid-jacketed holder 120' (see FIGURE 21). Warmed fluid is returned from the jacketing of the holder 120' through a corresponding flexible piping 126 to the header unit 124 and from it to outlet piping 127 and the sewer or recirculating connector 46a. The electrode-carrying holder 120 is in a similar manner connected by corresponding flexible piping to the same header 124.

Each piping 125, 126 may be a rubberized tube with a braided metal conductor cable insert, or ply with outer cover, to conduct current of one potential to a corresponding holder 120 and 120' from the conductive header 124. Current of one potential is supplied to the header 124 by overhead bus bars m and terminal tab n. It will be noted that the bus bar m is of opposite potential to the bus bar a of FIGURE 3 which supplies electric current to the mold unit 25. The flexible conduits or piping 125 and 126 serve as parallel electric lines for conducting electricity from the header 124 to the holders 120 and 120'. The holders 120 and 120', of course, in turn supply current to their respective electrodes 121 and 121'.

Summarized briefly, I have devised a plant installation system and procedure for forming cast metal ingots of improved quality and characteristics. In this connection, I have been able to effectively and efficiently energize and cool a swingably-mounted ingot mold with current of one potential while energizing the arc-melting electrode with current of opposite potential. The current of one potential for the mold may be supplied from bus bars to the stationary support structure and from it to the associated articulated frame and the ingot mold. The primary frame part of the articulated frame is swingably mounted at its back end portion by a vertical axis on the support structure to extend therefrom; and the secondary frame part is swingably mounted at its back end portion on the front end portion of the primary frame part to swingably carry the ingot mold at its front end portion. The means shown for carrying the mold includes a table support and means for rotating the mold about such support. Electrical lines extend from the support structure to the primary frame part, along the secondary frame part, through a swing connection between the primary and secondary frame parts that employs a conductor fluid or liquid, along the secondary part and from its table support, through a rotative connection also employing a conductor fluid or liquid, to the ingot mold. Use has been made of the fluid cooling lines which supply cooling fluid or water to jacketing of the electrode-carrying heads and to jacketing of the ingot mold for removing heat generated in the electric conductor lines or connections and thus, for maintaining them at a lower, more efficient current-carrying temperature. For example, as pointed out in the detailed description of the apparatus, the electric lines may extend along and within flexible hose connections and may make use of conductive connecting piping or tubing, etc. which also serves to carry the cooling fluid flow.

For forming an improved ingot, provision has been made for rotating the ingot during the arc-melting and building-up of metal therein and the progressive cooling of the molten metal upwardly from the bottom of the ingot towards the molten pool. Means is also provided, as illustrated in FIGURE 15 of the drawings, for varying, adjusting or controlling the axial alignment of the arc-melting electrode and its associated ingot mold and thus, the relationship of the end of the electrode with respect to the molten metal pool during the ingot-forming operation. In this connection, as illustrated, the end of the electrode (or the ends of a group of electrodes) may be moved between centered and off-centered positions with respect to the molten pool, as the melting operation progresses. In this way, a complete melting of the metal used in forming the ingot as well as a better conditioning of it may be accomplished to provide a cast ingot of better characteristics. This is particularly true when, as contemplated, the ingot mold and its molten metal pool are rotated with respect to the electrode during the melting and casting operation. I have also found in a consumable electrode melting procedure that a varying to offset relationship tends to produce a smoother, solidified-slag, protective egg-shell about the ingot casting in the mold, where a slag blanket is used over the molten metal during the ingot forming. This transverse-positioning or axial relationship control between the electrode and the mold is an important feature of my invention.

Another important feature is involved in providing an adjacent pair of electrode heads (servicing stations) at an ingot-forming station or area, and while employing the consumable electrode of one head in electric-arc forming and maintaining a molten metal pool at the top of the metal in the mold, maintaining the other head in "ready" position, so that when the first electrode has been consumed, the ingot may be immediately swung into an aligned position with the second electrode, the second electrode lowered into an arc-melting position, and the operation continued until a complete ingot body has been formed. When the second head is in its arc-melting position, then the operator may immediately replace the electrode stub of the first head with a new electrode, so that the new electrode will be available for use, either in continuing the first operation or in initiating a second ingot-forming operation. This dual or double-ram concept for consumable electrode utilization is important in effecting a substantially continuous melting, refining and casting operation to provide an ingot of a larger desired size.

By providing a pair of support structures positioned along spaced-apart, substantially opposed facing positions or longitudinal or vertical planes, each with an articulated mold-carrying frame, by providing an ingot forming station or stations in the spacing between such support structures, and a stripping station for each articulated frame in a sidewise-spaced relation and in substantial alignment with the vertical or longitudinal plane of an associated support structure, it is now possible to efficiently coordinate the forming and stripping of an ingot carried by one articulated frame and the forming and stripping of another ingot carried by the other articulated frame. The operations are coordinated in such a manner that the ingot mold of one articulated frame may be employed to form an ingot at the forming station, while the ingot mold of the other articulated frame is being stripped at its associated stripping station and, vice versa.

The arrangement is such that there is no limitation on the size of the ingot that may be substantially continuously formed at the forming station, from the standpoint that consumable electrodes will always be available to provide the requisite amount of metal, and will be in a "ready" position for immediate utilization when the articulated frame carrying the ingot mold within which metal is being formed is swung from one to the other of the electrode heads. In this manner, I can continue the forming of an ingot, without permitting a solidification of the top portion of the metal in the ingot mold and while retaining its molten pool, so that the finished ingot will not be defective at a transverse section therealong representing the change-over. Another important feature of the invention is the compactness of its layout, such that plant space is saved and more efficient and coordinated operations can be accomplished.

What I claim is:

1. A plant installation for substantially continuously forming a relatively large size substantially homogeneous cast solid metal ingot by progressively fusing-off each of a group of vertically-suspended consumable electrode solid metal bodies from a lower end of each of the bodies and wherein each of the bodies is of a predetermined length which comprises, an electrically-conductive mold having a solid ingot forming vertical mold cavity defined by a vertical outer side wall and a bottom wall, said mold cavity terminating at its upper end in an opening and providing a horizontally-centrally unobstructed metal solidfying and melting area vertically-upwardly from said bottom wall, support means carrying the mold in an upright position thereon and for supplying current of one potential to the mold, overhead means for individually vertically-suspending the electrode bodies and supplying electric current of opposite potential thereto; means for swinging said support means to move the mold cavity into substantial axial alignment with the lower end of one electrode body of the group and, after the one electrode body has been substantially used-up, into substantial axial alignment with the lower end of another electrode body of the group to form and maintain a molten metal pool from the electrode bodies within the mold cavity, means for anchoring said support means when the mold cavity is in substantial axial alignment with the lower end of each electrode body that is to be fused-off, means for rotating the mold on said support means at its anchored position; means associated with said overhead means to individually move the lower end of each electrode body downwardly into a fusing-off position within the mold cavity when the mold is in substantial axial alignment therewith, and after one electrode body has been substantially used-up to lift it out of position from within the mold cavity; said means for swinging being constructed to immediately swing said support means and move the mold cavity from substantial axial alignment with the used-up electrode body into substantial alignment with the lower end of another electrode body and to, in cooperation with said means for moving the lower ends of the electrode bodies into a fusing-off position within the mold cavity, continue the operation by initiating fusing-off of the other electrode body while the metal pool produced by the one electrode body is still molten, so that a complete ingot may be formed by the group of electrode bodies in a substantially continuous manner to produce a substantially homogeneous casting.

2. A plant installation for substantially continuously forming a relatively large size substantially homogeneous cast solid metal ingot by progressively fusing-off at least one of a pair of vertically-suspended consumable electrode solid metal bodies and wherein each body is of a predetermined length which comprises, an electrically-conductive mold having a solid ingot forming vertical mold cavity defined by a vertical outer side wall and a bottom wall, said mold cavity terminating at its upper end in an opening and providing a horizontally-centrally unobstructed metal solidifying and melting area vertically-upwardly from said bottom wall, a side-positioned stationary support structure, at least one articulated frame carried by an inner side of said support structure, said frame having a primary part swingably-mounted at one end to project from a side of said support structure and having a secondary part carried by said primary part, means swingably-mounting one end of said secondary part on the other end of said primary part to project therefrom, support means at the other end of said secondary part for removably-carrying the ingot mold in an upright position thereon, at least a pair of servicing stations for the ingot mold in a spaced relation with each other adjacent the inner side of said support structure, each of said servicing stations having overhead means vertically-suspending one consumable metal electrode body of the pair therefrom and supplying electric current of one potential thereto, the mold being moved between positions in which the mold cavity is substantially axially-aligned with each of the consumable electrode bodies of said stations by swinging said secondary part of said articulated frame with respect to said primary part thereof, means operatively-connected to said primary part for supplying cooling fluid and electrical energy of opposite potential thereto, swing-joint conductor means operatively connected between said primary and secondary parts for supplying cooling fluid from said primary part to said secondary part and the mold carried thereon, and rotatable conductor means and electrically-conductive fluid means cooperating with each other and positioned between said primary and secondary parts for supplying electrical energy of opposite potential from said primary part to said secondary part and to the ingot mold carried thereon.

3. A plant installation for substantially continuously forming a relatively large size substantially homogeneous cast solid meal ingot by progressively fusing-off at least one of a vertically-suspended group of consumable electrode solid metal bodies and wherein each electrode body is of a predetermined length and the cast metal ingot is stripped after being formed which comprises, an electrically-conductive mold having a solid ingot forming vertical mold cavity defined by a vertical outer side wall and a bottom wall, said mold cavity terminating at its upper end in an opening and providing a horizontally-centrally unobstructed metal solidifying and melting area vertically-upwardly from said bottom wall, support means carrying the mold in an upright position thereon and for supplying electric current of one potential to the mold, overhead means vertically-suspending the electrode bodies in a side-spaced relationship with each other and supplying electric current of opposite potential to each of said electrode bodies, means associated with said overhead means for individually moving the lower end of each of the electrode bodies into a fusing-off position within the mold cavity when the mold is in substantial axial alignment therewith to form and maintain a molten pool from the electrode body within the mold cavity, means for anchoring said support means in a position wherein the mold cavity is in substantial axial alignment with the lower end of the electrode body that is to be fused-off, a stationary support structure having a side-spaced position with respect to the electrode bodies, an articulated frame carried by said support structure and having a primary part and a secondary part, means swingably-suspending one end of said primary part from said support structure, a second means swingably-suspending one end of said secondary part from the other end of said primary part, said secondary part having means at its other end for receiving said support means that carries the mold, said secondary part being swingable about said second swingably-suspending means between positions in which the mold cavity is alternately in axial-alignment with each of the consumable electrode bodies, said articulated frame having means operatively associated therewith for supplying cooling fluid to and exhausting warmed fluid from the mold and for supplying electric current of the one potential to said support means and the mold irrespective of the swingable positioning of said secondary part, and said primary and secondary parts being swingable with respect to said support structure from a final position in which the mold cavity is in axial alignment with one of the consumable electrode bodies to an ingot stripping position at which said primary and secondary parts are in substantial longitudinal alignment with and along said support structure.

4. In a plant installation for substantially continuously forming a relatively large size substantially homogeneous cast solid meal ingot by progressively fusing-off at least one of a vertically-suspended group of consumable electrode solid metal bodies and wherein each consumable electrode body is of a predetermined length and the cast alloy metal ingot is stripped after being formed which comprises, an electrically-conductive mold having a solid ingot forming vertical mold cavity defined by a vertical outer side wall and a bottom wall, said mold cavity terminating at its upper end in an opening and providing a horizontally-centrally unobstructed metal solidifying and melting area vertically-upwardly from said bottom wall, a pair of opposed transversely-spaced-apart and longitudinally-extending stationary support structures, a pair of electrode stations between said support structures, overhead means at each of said electrode stations vertically-suspending one of the consumable electrode bodies and supplying electric current of one potential to the bodies, a pair of articulated frames each having a primary and a secondary part, one articulated frame of said pair being associated with one of said support structures and the other articulated frame being associated with the other of said support structures, means swingably-suspending the primary part of each of said articulated frames from an inner side of its associated support structure to project into the spacing between said pair of support structures, second means swingably-mounting one end of the secondary part of each of said articulated frames in a suspended relation on the other end of said primary part to project therefrom, means at the other end of the secondary part of each of said articulated frames for supporting the mold thereon, means supplying cooling fluid along the primary and secondary parts of each of said articulated frames to the mold carried by the secondary part thereof and also carrying electric current in an insulated relationship therealong and of opposite potential to the mold, said last-mentioned means having swing-joint means operatively connected between said primary and secondary parts for carrying the cooling fluid in a sealed-off relation between said primary and secondary parts of each of said articulated frames and for efficiently carrying electrical current between said primary and secondary parts, said secondary part of each of said articulated frames being constructed to swing about said primary part for moving the mold cavity of the mold carried thereby alternately into and out of axially-aligned positions with respect to the consumable electrode bodies of said electrode stations, so that when one electrode body is used-up the other electrode body may be employed to complete the forming operation of an ingot of a desired size within the mold cavity, each of said articulated frames being constructed for alternately with respect to each other moving the mold carried thereby into a cooperating relation with said electrode stations for forming a metal ingot in the mold carried thereby, and each of said articulated frames being swingable about its associated said support structure and said primary part to move it into a substantially parallel side position along its associated support structure for stripping an ingot from the mold carried thereby, while the other of said articulated frames is in a cooperating relation with said electrode stations.

5. An electric melting procedure for substantially continuously forming a relatively large size substantially homogeneous cast solid alloy metal ingot within an electrically-conductive ingot mold having a horizontally-centrally unobstructed mold cavity, that employs at least one of a vertically-suspended group of consumable electrode solid alloy metal bodies, and wherein each electrode body is of a predetermined length which comprises, the steps of vertically-suspending each electrode body in an adjacent spaced-apart relation with each other and applying electric current of one potential to each of them, applying electric current of opposite potential to the mold, swinging the mold into substantial vertical-alignment with one of the electrode bodies, moving the one electrode body into fusing-off position within the mold cavity, forming and maintaining a molten metal pool within the mold cavity, continuously supplying alloy metal from the one electrode mody to the molten metal pool and building-up the molten metal within the mold cavity while cooling the molten metal from the bottom of the mold and progressively forming an ingot therein, rotating the mold while variably-controlling the horizontal alignment of the molten metal pool with respect to the one electron body during the fusing-off and cooling steps to improve the fusing-off relation of the one electrode body with respect to the molten metal pool and better condition and improve the characteristics of the ingot being formed.

6. An electric melting procedure for substantially continuously forming a relatively large size substantially homogeneous cast solid alloy metal ingot within an electrically-conductive ingot mold having a horizontally-centrally unobstructed mold cavity, that employs a vertically-suspended pair of consumable electrode solid alloy metal bodies, and wherein each electrode body is of a predetermined length which comprises, the steps of vertically-suspending each electrode body in an adjacent spaced-apart relation with each other and applying electric current of one potential to each of them, applying electric current of opposite potential to the mold, swinging the mold into substantial vertical-alignment beneath one of the electrode bodies, moving the one electrode body into a fusing-off position within the mold cavity, forming and maintaining a molten metal pool within the mold cavity, continuously supplying alloy metal from the one electrode body to the molten metal pool and building up molten metal within the mold cavity while cooling the molten metal from the bottom of the mold and progressively forming an ingot therein, rotating the mold and controlling the alignment of the molten metal pool with respect to the one electrode body being employed during the fusing-off and cooling steps to improve the fusing-off relation of the one electrode body with respect to the molten metal pool, when the one electrode body has been substantially consumed, immediately swinging the mold into substantial vertical alignment beneath the other electrode body, moving the other electrode body downwardly into a fusing-off position within the mold cavity and re-initiating the melting operation while the metal of the molten metal pool in the mold cavity is still molten, and continuing the melting and cooling steps with the other electrode body until a relatively large size substantially homogeneous cast alloy metal ingot has been formed in the mold cavity.

References Cited by the Examiner

UNITED STATES PATENTS

| | | | |
|---|---|---|---|
| 1,040,517 | 10/1912 | Crawford | 22—65 XR |
| 1,815,999 | 7/1931 | Beardsley et al. | 22—36 |
| 2,385,136 | 9/1945 | Hopkins | 22—61 |
| 2,405,254 | 8/1946 | Hopkins | 22—182 |
| 2,675,414 | 4/1954 | Capita | 22—73 |
| 2,984,876 | 5/1961 | Garmy | 22—57 |

MARCUS U. LYONS, *Primary Examiner.*

JOHN P. CAMPBELL, WINSTON A. DOUGLAS, MICHAEL V. BRINDISI, *Examiners.*

UNITED STATES PATENT OFFICE
CERTIFICATE OF CORRECTION

Patent No. 3,220,067                      November 30, 1965

Robert K. Hopkins

It is hereby certified that error appears in the above numbered patent requiring correction and that the said Letters Patent should read as corrected below.

Column 2, line 60, after "station" insert -- or --; column 3, line 30, for "elarged" read -- enlarged --; line 71, after "frame" insert -- or --; column 7, line 65, for "though" read -- trough --; column 9, line 75, for "and" read -- or --; column 13, line 14, after "mold" insert -- cavity --; column 14, line 47, for "mody" read -- body --; line 52, for "electron" read -- electrode --.

Signed and sealed this 4th day of October 1966.

(SEAL)
Attest:

ERNEST W. SWIDER                                      EDWARD J. BRENNER
Attesting Officer                                           Commissioner of Patents